Sept. 25, 1956    W. STELZER    2,764,401
LETTER WEIGHING SCALES
Filed Dec. 18, 1953
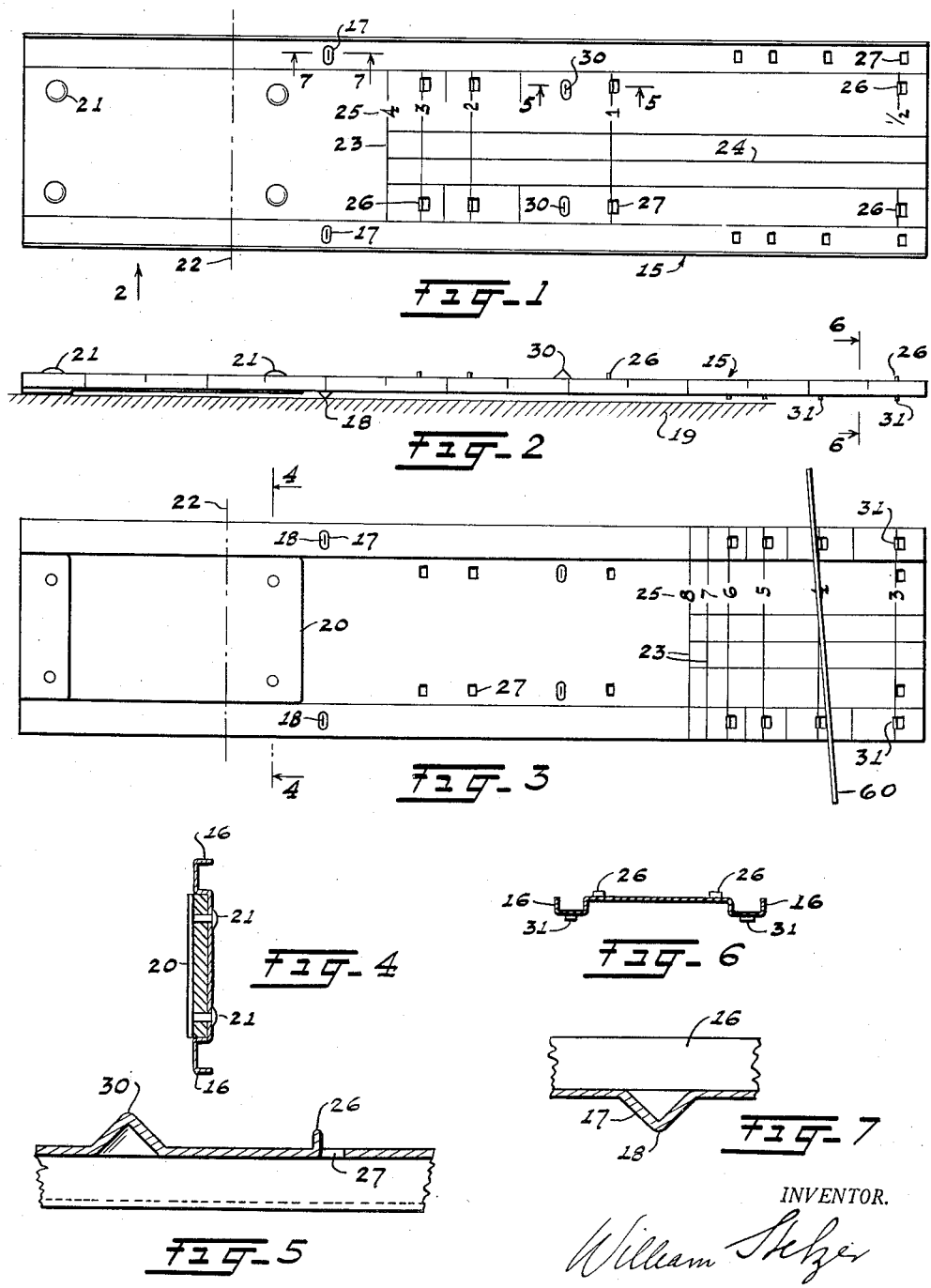
INVENTOR.
William Stelzer

United States Patent Office 2,764,401
Patented Sept. 25, 1956

2,764,401

LETTER WEIGHING SCALES

William Stelzer, Summit, N. J.

Application December 18, 1953, Serial No. 398,955

2 Claims. (Cl. 265—49)

The invention relates to letter weighing scales and more particularly to a letter weighing scale comprising a beam with a fixed counterweight and a knife edge fulcrumed on a flat and level surface of a piece of furniture or other object that is not a part of the weighing mechanism.

The object of the invention is to produce a simple and inexpensive letter weigher that is more accurate than spring scales or weighers using pendulous weights.

Another object is to obtain the greatest weighing accuracy in a range which is used most frequently, i. e., from 0 to 2 ounces.

Another object is to produce a novel scale that may consist of a single rigid piece adapted to rock on any flat surface, so that a surface of another object, such as the top of a desk or table, serves as the fulcrum for the scale.

Another object is to provide such a scale with a beam and fixed counterweight of minimum height so that their neutral axes are as close as possible to the plane on which the scale is fulcrumed.

Another object is to provide knife edges on both top and bottom sides of the beam at different locations relative to the counterweight so that the scale will operate in one range and when turned over on the other side it will operate in another range.

Other objects and advantages of this invention will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a plan view of the improved scale;

Fig. 2, an elevation thereof as seen in the direction of arrow 2;

Fig. 3, a plan view of the scale in an inverted position;

Fig. 4, a section taken on lines 4—4 of Fig. 3;

Fig. 5, a section on a larger scale taken on lines 5—5 of Fig. 1;

Fig. 6, a section taken on lines 6—6 of Fig. 2; and

Fig. 7, a section on a larger scale taken on lines 7—7 of Fig. 1.

Before explaining the present invention in detail, it is to be understood that the invention is not limited in its application to the details of construction and arrangement of elements illustrated in the accompanying drawings, since the invention is capable of other embodiments and of being practiced or carried out in various ways. Also it is to be understood that the phraseology or terminology employed herein is for the purpose of description and not of limitation.

Referring now to Figs. 1-7, the scale comprises a beam 15 preferably formed of a piece of thin sheet metal and provided with longitudinal reinforcing ribs 16 having indentations 17 forming aligned knife edges 18 adapted to rest on a level surface 19 so that the scale can rock about edge 18, the latter acting as the fulcrum of the scale. This surface may be the top of a desk or table or the flat and level surface of any object. The knife edge may be smooth and slightly rounded so that the surface on which the scale is placed is not marred. The knife edge 18 divides the beam into two arms, the shorter one of which carries a counterweight 20 secured by means of rivets 21 so that the scale, consisting of beam 15 and weight 20, forms one rigid piece. The center of gravity of the latter is located on line 22, whereby the total weight of the scale produces a turning moment about edge 18 in a counterclockwise direction as viewed in Fig. 2, such turning moment being counteracted by the weight of a letter balanced edgewise on the longer arm of beam 15. The position where a balance is obtained represents the weight of the letter or article. The positions where the counteracting force required to produce a balance is equal to standard units of weight are marked by lines 23. The latter may be engraved into the metal, or the sheet metal may be lithographed prior to stamping, whereby lines 23 and longitudinal lines 24, as well as weight indicating numerals 25, the computed postage in the rectangles formed by lines 23 and 24, and other information may be printed on the metal sheet in the lithographing process. The legend giving the computed postage and other conventional information is omitted in the different views in order not to encumber the drawing. Lines 23 are additionally marked by stops in the form of small tabs 26 struck out of the plane of the sheet metal, leaving a rectangular hole 27. These tabs are bent at right angles to the plane of the beam so that in the plan view their outer edges are aligned with lines 23, which are parallel with a line projected through edges 18.

While edges 18 and tabs 26 are in use when the scale is placed on a surface as shown in Figs. 1 and 2, in the inverted position shown in Fig. 3 another set of fulcrum edges 30 and tabs 31 are in operation. They are similar to edges 18 and tabs 26 respectively, except that their location on the beam is different. Thus the arrangement on one side provides a weighing range from ½ ounce to 4 ounces and on the other side from 3 ounces to 8 ounces. Observing the distance between the ½ ounce line and the 1 ounce line, it is apparent that small weights can be determined with comparatively great accuracy, which is of special advantage since small weights occur most frequently. The ½ ounce weight is useful in determining air mail postage to foreign countries. As shown in Fig. 2, the sides of the beam may be marked with graduations of units of lengths, such as inches, so that the beam may be used as a measuring scale or ruler too.

The mode of operation of the novel scale may at this point have become apparent. The letter to be weighed is placed on the beam edgewise and held loosely between forefinger and thumb so that the letter tips from one to the other when it is moved past dead center. While the letter tilts from one finger to the other and moves over dead center, its full weight acts on the beam. In the construction shown in Figs. 1–7, the letter is simply moved along the beam. If the latter tips when the letter rests between two graduations, no further weighing is necessary, as the postage indicated between the two graduations applies. More careful weighing is required if the weight of the letter approaches an even unit where the postal rate changes. Then it may be placed next to tabs 26 or possibly on top of them, and the letter balanced between the fingers of the user as described, so that the full weight acts on the beam. The letter may also be placed as illustrated in Fig. 3, where numeral 60 indicates the letter to be weighed.

Having thus described my invention, I claim:

1. A letter weighing scale comprising a relatively wide beam of small height, a counterweight at one end of said beam rigidly secured to said beam, transversely aligned knife edges in an intermediate portion of said beam extending below said beam so that said beam may fulcrum on a flat level surface by means of said knife edges, said flat level surface belonging to an object which is separate and not a part of said letter weighing scale, and a plurality of raised locating tabs on said beam remote from said counterweight, said locating tabs serving as stops against which a letter may be placed, said tabs indicating units of weight required to be applied at said tabs to cause said letter weighing scale to be in balance, said tabs indicating a particular unit of weight being spaced from each other and transversely aligned.

2. A letter weighing scale comprising a relatively wide beam of small height, a flat counterweight of small height rigidly secured at one end of said beam, transverse knife edges in an intermediate portion of said beam and extending below said beam so that said beam may fulcrum on a flat level surface by means of said knife edges, said flat level surface belonging to an object which is not a part of said letter weighing scale, a plurality of raised locating tabs on top of said beam remote from said counterweight, said locating tabs indicating units of weight required to be applied at said tabs to cause said letter weighing scale to be in balance, second transverse knife edges extending above said beam and located a different distance from said counterweight than said first mentioned knife edges, and a plurality of corresponding locating tabs underneath said beam so that said beam may be inverted and said second knife edges fulcrum on said flat level surface, whereby said letter weighting scale operates in a weighing range different from that obtained in the first mentioned position.

References Cited in the file of this patent

UNITED STATES PATENTS

| | | |
|---|---|---|
| 178,673 | Rhea | June 13, 1876 |
| 418,708 | Fitch | Jan 7, 1890 |
| 1,318,595 | Richie | Oct. 14, 1919 |
| 1,622,924 | Richie | Mar. 29, 1927 |
| 1,659,641 | Smith | Feb. 21, 1928 |
| 2,335,693 | Osterberg | Nov. 30, 1943 |

FOREIGN PATENTS

| | | |
|---|---|---|
| 22,337 | Germany | May 21, 1883 |
| 504,103 | Germany | Dec. 22, 1928 |